United States Patent
Piehler et al.

[11] Patent Number: 5,940,196
[45] Date of Patent: Aug. 17, 1999

[54] OPTICAL COMMUNICATIONS SYSTEM WITH WAVELENGTH DIVISION MULTIPLEXING

[75] Inventors: David Piehler, Half Moon Bay; Xingyu Zou, San Jose; Alan C. Nilsson, Mountain View; Chien-Yu Kuo, Cupertino, all of Calif.

[73] Assignee: Harmonic Lightwaves, Inc., Sunnyvale, Calif.

[21] Appl. No.: 08/858,067

[22] Filed: May 16, 1997

[51] Int. Cl.[6] ................................................... H04J 14/02
[52] U.S. Cl. ......................... 359/133; 359/125; 359/181
[58] Field of Search ............................ 359/114, 124–125, 359/133, 173, 181, 188, 195

[56] References Cited

U.S. PATENT DOCUMENTS

| | | | |
|---|---|---|---|
| 4,393,518 | 7/1983 | Briley | 455/617 |
| 5,023,945 | 6/1991 | Childs | 455/617 |
| 5,126,871 | 6/1992 | Jeffers | 359/154 |
| 5,162,937 | 11/1992 | Heidmann et al. | 359/124 |
| 5,253,309 | 10/1993 | Nazarathy et al. | 385/4 |
| 5,257,124 | 10/1993 | Glaab et al. | 359/124 |
| 5,278,688 | 1/1994 | Blauvelt et al. | 359/125 |
| 5,430,568 | 7/1995 | Little et al. | 359/124 |

*Primary Examiner*—Kinfe-Michael Negash
*Attorney, Agent, or Firm*—Skjerven, Morrill, MacPherson, Franklin & Friel LLP; Norman R. Klivans

[57] ABSTRACT

A wavelength division multiplexer (WDM) in an optical fiber transmission system launches analog signals, for instance a multi-channel television signal. The WDM enhances signal quality by transmitting along a single fiber two different optical wavelength signals, each carrying identical RF information. This results in a 3 dB improvement in carrier to noise ratio. The WDM combines two or more wavelengths centered around for instance 1550 nm or 1310 nm. A typical difference between the two wavelengths is 3 nm. In other embodiments, more than two wavelengths are used. The receiver is for instance a single photosensitive element. The phase of the two RF signals is adjusted in the optical or RF domain to be the same upon arrival at the receiver. In other embodiments, the receiver includes two photosensitive elements, each receiving from a receiver end WDM a single wavelength. In this case, the phase adjustment may be applied at the receiver in the optical or RF domain.

23 Claims, 6 Drawing Sheets

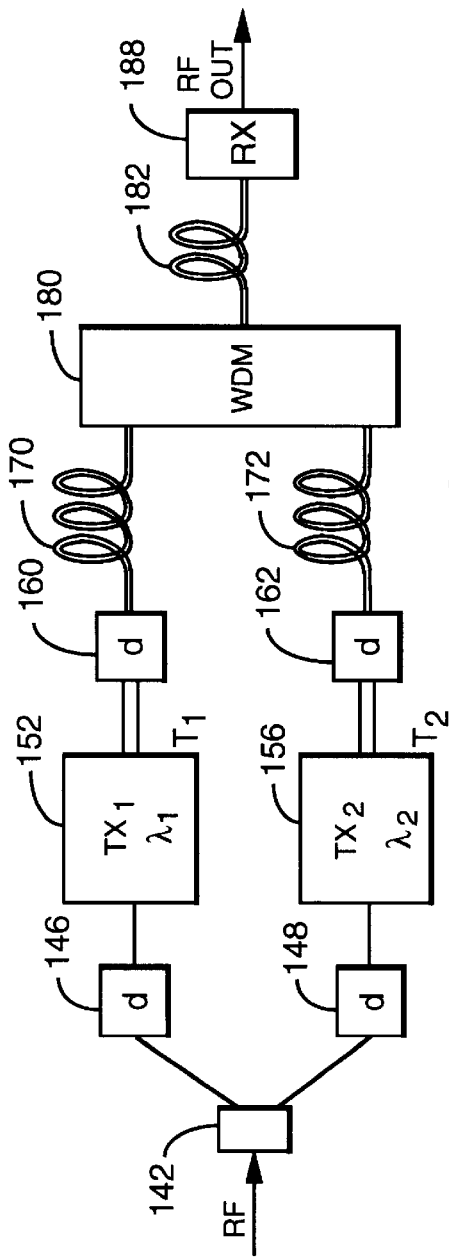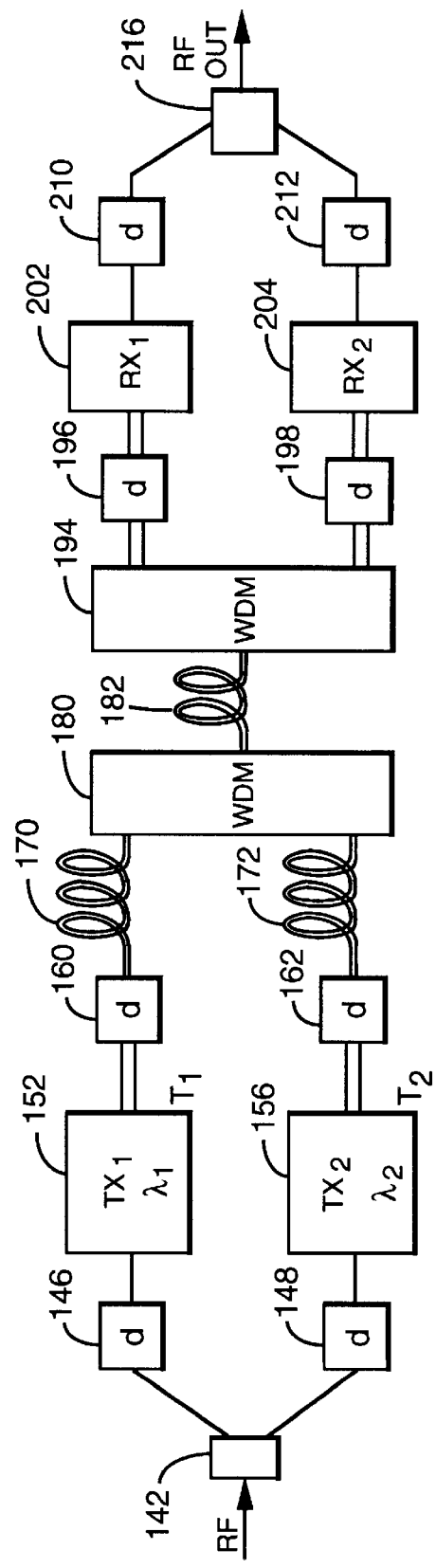
FIG. 7A
FIG. 7B

OPTICAL COMMUNICATIONS SYSTEM WITH WAVELENGTH DIVISION MULTIPLEXING

FIELD OF THE INVENTION

This invention relates to optical communications and more specifically to an optical communications system having wavelength division multiplexing.

BACKGROUND OF THE INVENTION

Optical communications systems are well-known and typically include a transmitter system with a light source (e.g. a laser or laser diode) which emits a light beam. In a directly modulated optical communication system, the light source is directly modulated by an applied RF (radio frequency) signal such as a cable television (CATV) signal including many TV channels. In an externally modulated system, the light beam output by the light source is coupled to a light modulator (a phase or intensity modulator or both). The RF signal is applied to the electrical input terminal of the modulator which thereby modulates the light beam. The modulated light beam, in either case, is then coupled to a span of optical fiber, for instance 25 kilometers long or longer. The distal end of the fiber optical span is coupled to a receiver which detects the optical signal and extracts the RF signal.

In such optical systems it is a well-known problem that the carrier to noise ratio (CNR) at the receiver is lower than desired. This limits the length of the optical fiber span which can be used without use of a repeater (amplifier). Such systems are also prone to non-linear optical effects such as self-phase modulation, modulation instability, and SBS (stimulated Brillouin scattering).

Attempts to increase information carrying capacity include a system as in FIG. 1 with a wavelength division multiplexer (WDM). In this case, two transmitters 12 and 14 are each modulated by a different RF signal, designated RF1 and RF2. Transmitters 12, 14 each include a laser or laser diode directly or externally modulated by the RF signal. In this and the accompanying diagrams a single line connecting blocks indicates a conductor carrying an RF signal, while double lines indicate an optical fiber or optical coupler carrying a light signal. As is conventional, the term "frequency" herein refers to a radio frequency (electrical) signal, and the term "wavelength" refers to a light (optical) signal.

Transmitters 12 and 14 output light wavelengths respectively $\lambda_1$ and $\lambda_2$ which differ by a certain amount in terms of wavelength. Wavelength division multiplexer (WDM) 16 is for instance a commercially available component of a type well-known in telephony for carrying telephone signals on optical fiber. WDM 16 has a single output port which is coupled to a span of optical fiber 20. At the receiver end, receiver 24 typically includes a two receivers 24, 26 (photodiodes) sensitive respectively to wavelengths $\lambda_1$ and $\lambda_2$ and coupled to a second WDM 22 which convert the received light signals into output signals RF1, RF2. Hence in this system the two input RF signals RF1 and RF2 differ, and WDM 16 is used to increase system carrying capacity (the amount of information transmitted on a single fiber) so that the system carries the two RF signals RF1, RF2 instead of the usual one. It is to be understood that the RF signals RF1, RF2 are, for instance, telephone or multi-channel CATV. While this use of wavelength division multiplexing does increase the signal-carrying capacity of a single fiber, it does not improve signal quality in any way over a system which carries a single RF signal without the WDM 16 being present. In fact, undesirable effects such as cross talk are increased. The cross talk problem in analog communications systems is well known; see e.g. K. Kikushima, et al. Optical Fiber Communication Conference 1995, paper PD-24; A. Li et al., Electronics Letters, vol. 31, pp. 1538–9, 1995; and Z. Wang et al., IEEE Photonics Technology Letters vol. 7, pp. 1492–4, 1995. Hence while this is an example of use of a WDM, there is no resulting benefit in terms of signal quality improvement.

SUMMARY

In accordance with this invention, in an optical communications system an optical WDM effectively serves as an RF signal power combiner (in the RF domain) to improve signal quality. This is achieved by providing, as described above, two light sources operating at different wavelengths. However contrary to what is shown in FIG. 1, the optical output signals of the two light sources are both modulated by the same RF signal. Hence while no capacity improvement is achieved, this does significantly improve signal quality. The WDM launches identical information (the information-carrying part of the RF signal) in the form of light modulation onto a single optical fiber at two (or more) distinct wavelengths. For instance, the same 80-channel CATV signal is applied to two separate light sources to modulate them, and hence propagate two wavelengths carrying the same signals along the same fiber. The invention however is not limited to CATV transmission, and is applicable generally to frequency division multiplexed (video and/or data) signals.

Advantageously by recombining the two identical signals at the receiver end, the carrier to noise ratio (CNR) is increased because the RF carriers add coherently, while any noise present adds incoherently, thereby boosting the CNR by up to three dB (a factor of two). Also by launching the optical signals at two (or more) distinct wavelengths where each optical signal is below the SBS threshold, the overall threshold for SBS is effectively raised thereby increasing CNR. Since a lower power is used at any given wavelength, other nonlinear optical effects such as self-phase modulation and modulation instability are reduced.

Advantageously, cost is lowered by using standard optical communication components in some embodiments of the invention. Use of two distinct wavelengths allows the system to share components such as optical amplifiers, intensity and phase modulators, isolators, optical couplers and splitters.

Transmitting two or more analog subcarrier-multiplexed signals on the same optical fiber has been found to cause cross talk between the channels in the prior art system shown in FIG. 1. However in accordance with the invention, by placing the same information on the subcarriers at different optical wavelengths, cross talk is not a problem since each RF subcarrier can only cross talk with an identical (or nearly identical) subcarrier at a different wavelength.

The present invention, in certain embodiments, directly modulates the laser source in the light sources. In other embodiments, the light sources include a laser source which is externally modulated by the RF signal. The receiver in some embodiments is a single photo-detector (e.g. photodiode) sensitive to both transmitted wavelengths, while in other embodiments the received multi-wavelength optical input signal is demultiplexed by a second WDM at the receiver end and the two resulting optical signals are each applied to a different photodiode. The electrical output signals from the two photodiodes are then combined to yield the RF output signal.

In certain embodiments, a delay, either electronic or optical, is provided to correct for any propagation time difference (phase difference) between the two optical signals at the two different wavelengths. This is because optical fiber typically propagates light at a speed which is wavelength dependent (a phenomenon known as dispersion.) Relatively small phase (delay) adjustments in either the RF path or at the proper point in the optical signal path can correct for this.

While in one embodiment two light wavelengths are propagated, in other embodiments more than two light wavelengths are propagated. Typically the difference between any two wavelengths used is about 3 nm, although this is not limiting. In certain embodiments, the central light wavelength propagated is 1550 or 1310 nm, because there are commercially available receiver and transmitter components for these wavelengths. Again, this is not limiting.

In accordance with this invention with two wavelengths propagated, the total launched optical power can be 3 dB greater than that allowed by state of the art SBS suppression techniques applied to single wavelength systems, due to use of two wavelengths. Also, CTB (composite triple beat) distortion is reduced over that of a conventional optical communications system, by coherently recombining the two RF signals.

BRIEF DESCRIPTION OF THE DRAWINGS

FIGS. 7A, 7B, 8A and 8B show other embodiments of optical communications systems in accordance with this invention.

DETAILED DESCRIPTION

Figure 2:
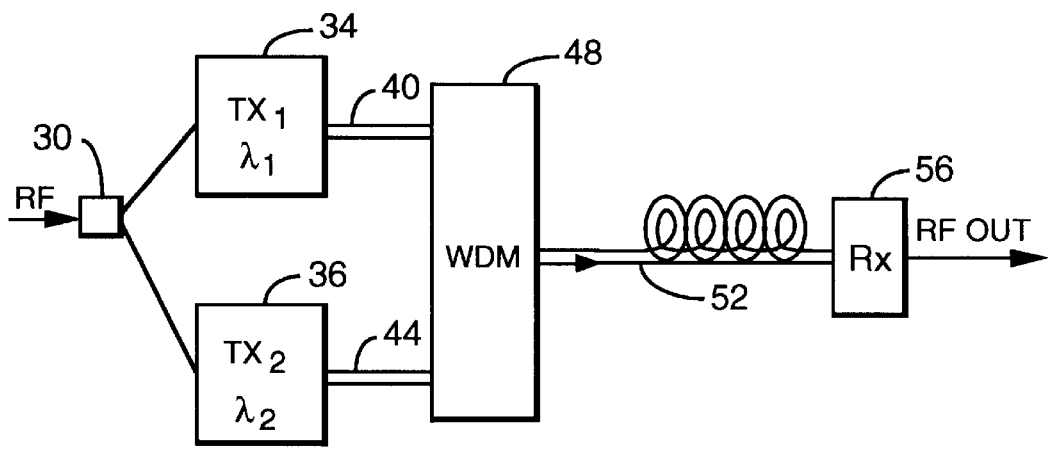
FIG. 2 shows an embodiment of an optical communications system using a WDM in accordance with this invention.

FIG. 2 shows in a block diagram an optical communications system in accordance with this invention. The illustrated components are all conventional, and therefore not disclosed in greater detail. FIG. 2 shows a system in which the two conventional optical transmitters 34 and 36 are each driven by a single RF signal applied to an input terminal of an RF splitter 30 which is connected electrically to drive the two transmitters 34 and 36, i.e. modulate their output signals. (A transmitter is a device with an RF input and an optical output, and includes a light source.) Transmitters 34, 36 are of the directly or externally modulated type. The power supply components to drive transmitters 34 and 36 are conventional and not shown. The transmitters 34 and 36 output light beams respectively having wavelengths $\lambda_1$ and $\lambda_2$ which differ by e.g. approximately ±3 nm. Typically the central wavelength is e.g. 1310 or 1550 nm, although this is not limiting. It is possible to obtain commercially laser diodes for transmitters 34, 36 which output a precise wavelength. Transmitters 34 and 36 are coupled respectively by optical couplers 40, 44 to two input ports of a wavelength division multiplexer (WDM) 48.

WDM 48 is for instance a commercially available device such as the multi-channel WDM available from DiCon Fiber Optics, Inc., of Berkeley, Calif. Preferably the WDM 48 is a "dense WDM", i.e. the difference in wavelengths between $\lambda_1$ and $\lambda_2$ is small, as described above. This provides the advantage of reducing relative dispersion in the fiber link.

Such WDMs typically have a number of input ports (not limited to two) and a single output port. They can used in the other direction, with the single port being the input port and the multiple ports being the output port. The single output port of WDM 48 is coupled to a span of optical fiber 52, which may be many kilometers long. The optical fiber 52 may be either a standard (non-dispersion shifted), dispersion shifted, non-zero dispersion shifted, or a dispersion compensating fiber or any combination thereof. The optical train, shown in block diagram form in FIG. 2, may include one or more conventional optical amplifiers (described below), optical isolators, optical couplers or splitters, or optical phase or intensity modulators as needed.

A distal terminus of optical fiber 52 (at the receiver end) is coupled to the input port of a receiver 56 which converts the received light signal into an RF output signal which at least nominally is identical to the RF input signal applied to splitter 30. Receiver 56 may take various forms. In its simplest form, it is a single photo-sensitive diode device sensitive to both wavelengths $\lambda_1$ and $\lambda_2$, but may take other forms as described further below. Where the receiver 56 is a single device, the phase of the signals $\lambda_1$ and $\lambda_2$ typically is adjusted, either by an electronic or optical delay, so that the phase at the receiver 56 of the received optical signals is nearly as possible the same. Achieving this is described further below. In another embodiment (described below), receiver 56 includes several photo-sensitive devices, each receiving light of a particular wavelength, i.e. $\lambda_1$ or $\lambda_2$, the RF output signals from which are then combined electronically, in which case the phase of the two different wavelength signals $\lambda_1$ and $\lambda_2$ may be adjusted optically or electrically by suitable delay elements.

Figure 1:
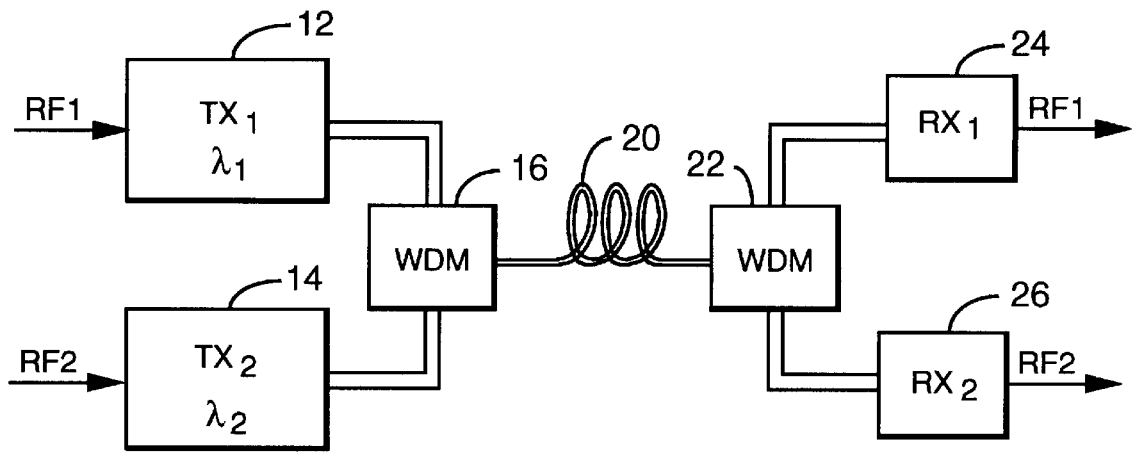
FIG. 1 shows a prior art optical communication system using a WDM.

Hence in accordance with this invention, the cross talk problem present in the prior art system of FIG. 1, where there is cross talk between differing information on different optical wavelengths carried on the same RF channel is avoided; in this case, cross talk is not problematic because the identical information is carried on the same RF channel at the two distinct wavelengths $\lambda_1$ and $\lambda_2$. (To the extent the information on the two channels is out of phase, this lowers amplitude at the receiver but does not cause cross talk.) The optimum difference in the wavelengths $\lambda_1$ and $\lambda_2$ is dependent on the actual properties of WDM 48 and fiber span 52, as determined by experimentation. Preferably the output power levels of transmitters 34 and 36 are matched, but this is not essential.

Figure 3:
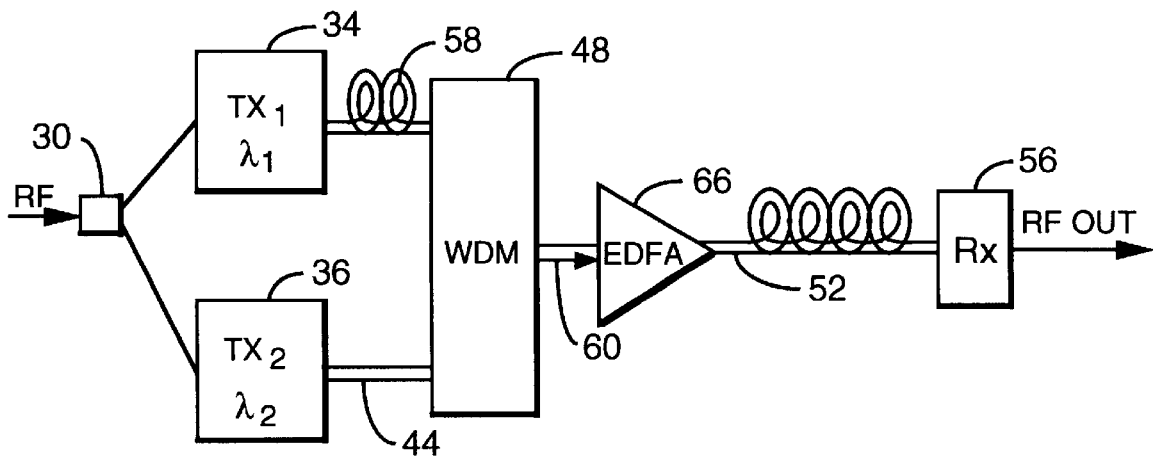
FIG. 3 shows a modification of the system of FIG. 2, including an optical amplifier.

FIG. 3 shows another optical communications system which is a modification of that of FIG. 2; components in FIG. 3 similar to those of FIG. 2 have identical reference numbers. In FIG. 3, a short additional length 58 of optical fiber is coupled between transmitter 34 and the associated input port of WDM 48, to provide a phase delay to the output signal from transmitter 34 since, in this case, wavelength $\lambda_1$ propagates faster through optical fiber 52 than does wavelength $\lambda_2$. Hence this delay, caused by the additional fiber 58, puts the two optical signals $\lambda_1$, $\lambda_2$ in phase at receiver 56. Also, in this case a conventional optical amplifier (e.g.

erbium doped fiber amplifier) 66 is coupled between WDM 48 and optical fiber span 52 to increase optical launch power. Need for EDFA 66 is dependent upon the characteristics and length of optical fiber span 52. Additional optical amplifiers may be provided where needed in the system, as is conventional. In the FIG. 3 embodiment, the delay element (optical fiber 58) may be as short as 51 cm of optical fiber for a 50 kilometer length of type SMF-28 optical fiber span 52, where the difference between the two wavelengths $\lambda_1$ and $\lambda_2$ is 3 nm in the 1550 nm region.

A general equation for calculating the amount of optical fiber for delay compensation is:

D=dispersion given in units of ps/(nm×km). For standard (non-dispersion shifted) fiber D is about 17 ps/(nm×km) at 1550 nm.

Let $\Delta t$ be the time delay between two lightwaves at about 1550 nm separated by $\Delta\lambda$ in wavelength, after propagating through L distance of fiber.

Then $\Delta t = D \times \Delta\lambda \times L$. To convert $\Delta t$ into a length of fiber, $\Delta x$=length of fiber=$\Delta t \cdot$(speed of light)/(index of refraction of fiber). So, $\Delta x = D \cdot \Delta\lambda \cdot L \cdot c/n$. As in example, for signals at wavelength $\lambda$=1550 and 1553 nm, through a span of 50 km of standard fiber: $\lambda$. $\Delta x$=17 ps/(nm·km)·3 nm·50 km·3·10$^{10}$ cm/sec/1.5=51 cm. Therefore in a fiber span of 50 km length, one may expect to use 51 cm of fiber to compensate for the difference of the speed of light at the two wavelengths.

The delay element need not be as shown in FIG. 3; as described above, it may be located elsewhere, for instance interposed between the output port of RF splitter 30 and the input port of laser 34. In this case, the delay element would be an electrical (RF) delay. The delay may also be provided (where appropriate) instead in receiver 56, as described below.

In other embodiments, the phase delay adjustment is accomplished by a combination of optical delay elements and RF delay elements. For instance, most of the phase delay in one embodiment is accomplished by a length of optical fiber 58 as in FIG. 3, while small additional phase adjustments are made by a suitably connected adjustable RF delay line. The following describes equalizing the lengths of the two paths with a combination of RF (coaxial cable) and optical (fiber) delay.

Figure 4:
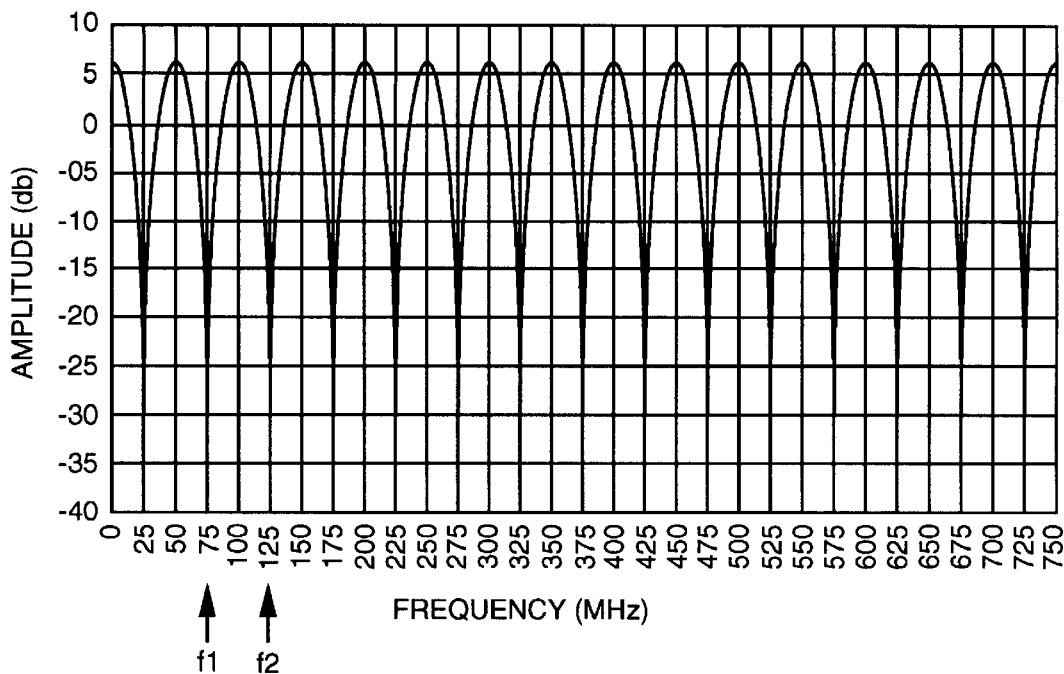
FIG. 4 shows the display of an RF spectrum analyzer used to equalize path lengths (delays).

If the two inputs are combined with excessive path length difference, periodic "notches" will occur in the frequency spectrum of the receiver as shown in FIG. 4. Notch depth is determined by how closely matched the input levels are (at the notch frequency) while the spacing between adjacent notches depends on the delay difference between the two paths. A spectrum analyzer connected to the RF output of the receiver(s) enables notch-to-notch frequency spacing to be measured. As an example, the path length difference can then be determined with the following equations:

| Required Length: | (meters) = 200/(f2-f1); | yields the required optical fiber length (This equation is valid at both 1310 nm and 1550 nm.) |
|---|---|---|
| or | (meters) = 237/(f2-f1); | yields the required coaxial cable length |

Where f1 is any notch frequency and f2 is the next highest notch frequency. Both f2 and f1 are in units of MHz.

As an example, FIG. 4 shows the spectrum for a communications system where one notch (f1) occurs at 75 MHz and the next highest notch (f2) occurs at 125 MHz. The above equations yield

| | Required optical fiber length | = | 200/(125-75) |
|---|---|---|---|
| | | = | 200/50 |
| | | = | 4 meters |
| or | Required coaxial cable length | = | 237/(125-75) |
| | | = | 237/50 |
| | | = | 4.7 meters |

Once the path length difference is known, the calculated amount of coaxial cable is added. Long lengths of coaxial cable may require another adjustment of the associated receiver's tilt and level controls to compensate for high frequency attenuation.

In some applications as described above, it is preferable to equalize the path lengths with added optical fiber rather than in the RF domain. The optical fiber is then added to the shorter path. The use of a noise source as input to the transmitter may also be required in cases where the carrier spacing does not provide enough resolution for measuring small notch-to-notch frequency spacing. Spacing of 12 MHz or less (corresponding to 76.6 meters or more of optical fiber length difference) will need a white noise source as the transmitter RF input in order to accurately determine notch-to-notch frequency spacing.

Also, it is possible in certain embodiments to accomplish the desired phase adjustment by adjusting the operating temperature of one of the transmitter lasers or laser diodes, thereby altering its output wavelength. A combination of these techniques—light delay, RF delay, and wavelength adjustment—may also be used.

Figure 5:
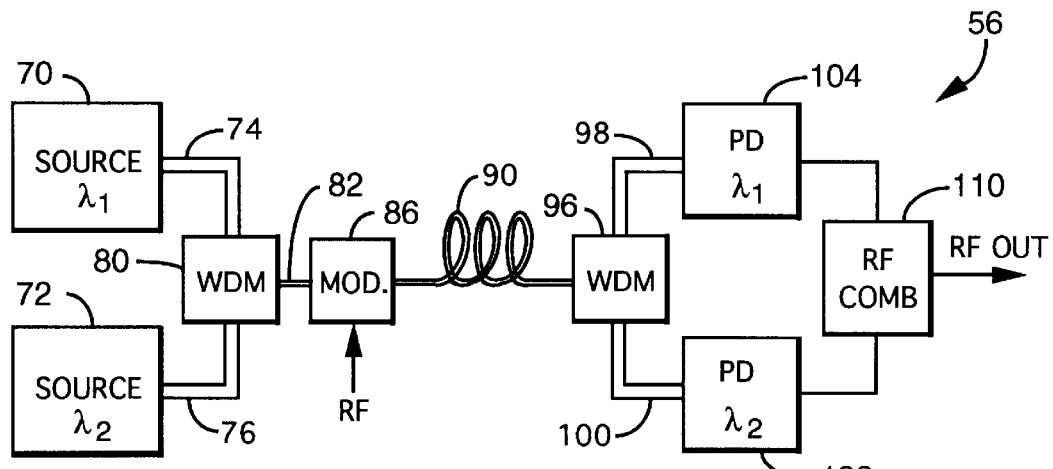
FIG. 5 shows an externally modulated optical communications system in accordance with this invention.

The embodiment of FIG. 5 in accordance with this invention illustrates two optical input wavelengths driving a single external modulator. In this case, the light signals from light sources 70 and 72 are coupled respectively by couplers 74 and 76 to a WDM 80 which is similar to the type described above. The light signal output from WDM 80 is coupled by coupler 82 to the single input port of an external modulator 86. Modulator 86 is e.g. the dual output modulator from UTP of Bloomfield, Conn. The RF signal is applied to an electrical port (intensity or phase modulation port) of modulator 86. The fiber optical span 90 then receives the multiplexed and modulated optical signal, which is thereby transmitted to a receiver 56, shown here in greater detail. In this case receiver 56 is more sophisticated than the type discussed above. The input light signal from optical fiber span 90 is demultiplexed by WDM 96 (similar to WDM 80 but reverse-connected) and applied to two couplers 98 and 100 which are in turn coupled to photodiodes 104 and 108 which are respectively sensitive to wavelengths $\lambda_1$ and $\lambda_2$ as output by WDM 96. Photodiodes 104 and 108 respectively output RF signals which are then applied to an RF combiner 110 which outputs the RF output signal. In this case, any phase delay is provided either in coupler 98 as an optical delay line or as an electrical delay in RF combiner 110.

An optical amplifier(s) as shown in FIG. 3 may be used in this embodiment as needed.

While these embodiments show a WDM in the transmitter and/or receiver to which two different wavelengths $\lambda_1$ and $\lambda_2$ are applied, it is to be understood that such a WDM may multiplex or demultiplex three or more wavelengths. In such a case an additional transmitter(s) are coupled to the transmitter side WDM in the FIGS. 2, 3 or 5 embodiments. This provides additional power, depending on the number of additional laser sources used.

Each photodiode in the receiver 56 can receive optical power up to its distortion limit. This limit is 3 dBm for example, and a two wavelength-two photodiode receiver as in FIG. 5 can effectively increase the total received optical power to 6 dBm without distortion. (This increases the RF signal strength without exceeding the RF distortion limit of any photodiode.)

Figure 6A:
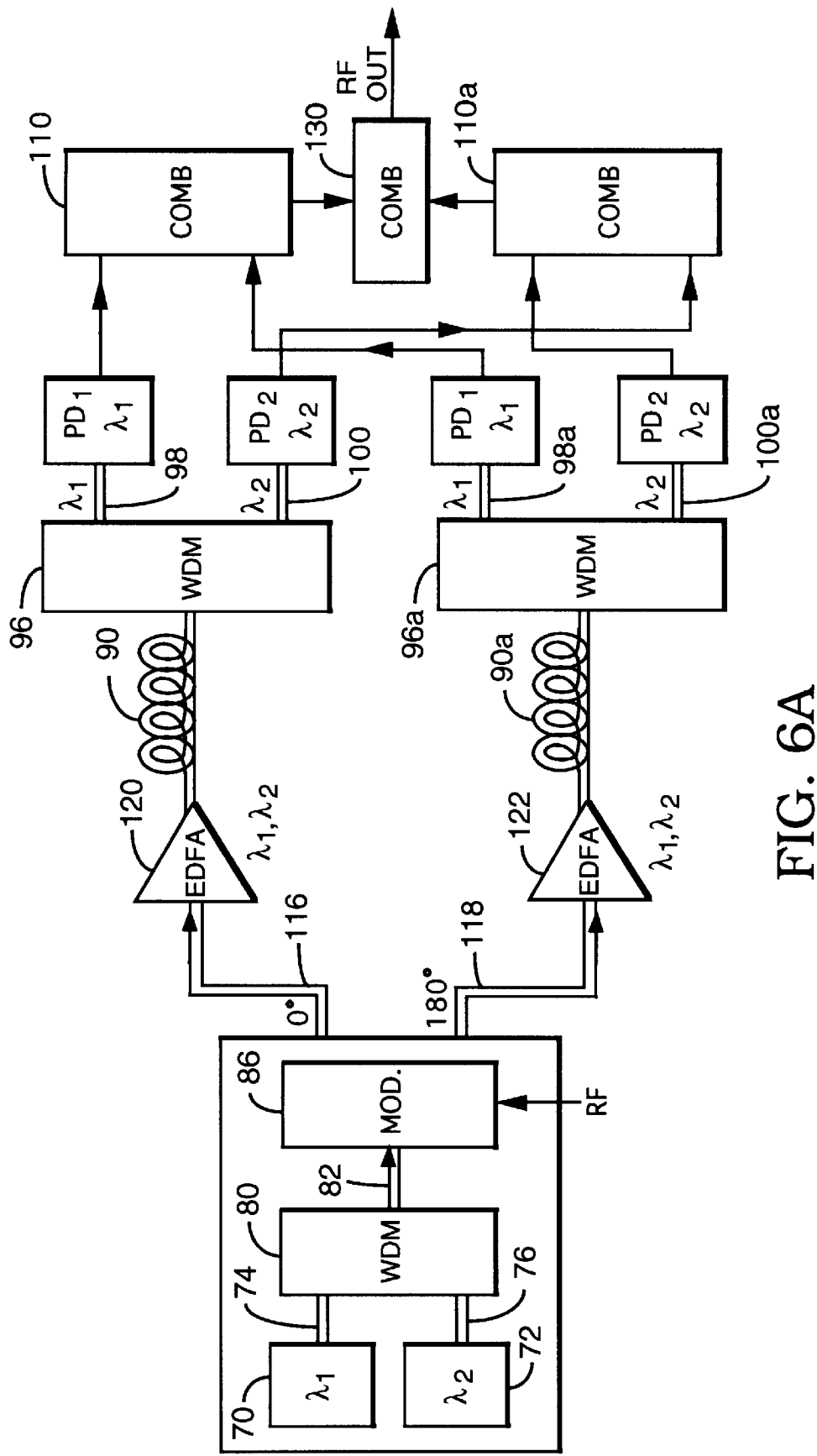
FIGS. 6A, and 6B show various embodiments of optical communications systems in accordance with this invention, using two optical fibers and various arrangements of the transmitters and receivers.

A modification to the system of FIG. 5 is shown in FIG. 6A. In this case, the transmitter section is essentially identical, except that the modulator 86 has two output ports outputting two optical signals which are shown to be respectively at 0° and 180° in terms of their relative phases. Such a modulator is known from Nazarathy et al., U.S. Pat. No. 5,253,309, issued Oct. 12, 1993 and incorporated herein by reference (see e.g. FIG. 9). Optical amplifiers 120 and 122 are incorporated as described above. The lower channel in FIG. 6A includes the 180° output port of modulator 86 coupled by connector 118 to optical amplifier 122, driving a second fiber optic span 90a. (In this diagram, components having the letter "a" as a suffix to their reference number are the lower channel complements of the similarly numbered elements in the upper channel.) The receiver here includes two cross-coupled receivers of the type shown in FIG. 5 with the components numbered similarly as in FIG. 5. In this embodiment, the two receivers are cross-coupled (in the RF domain) by RF combiners 110 and 110A, each receiving a signal from both the upper and lower channel. The output signals from combiners 110 and 110A are combined by a third combiner 130 to provide the actual RF output signal. This receiver, which uses differential detection, is easily understood in light of the above-referenced patent, and each combiner 110, 110A and 130 is of the type described in that patent. Here the RF signal may improved in terms of power by 3 dB by use of two channels, with reduced distortion (CTB).

Figure 6B:
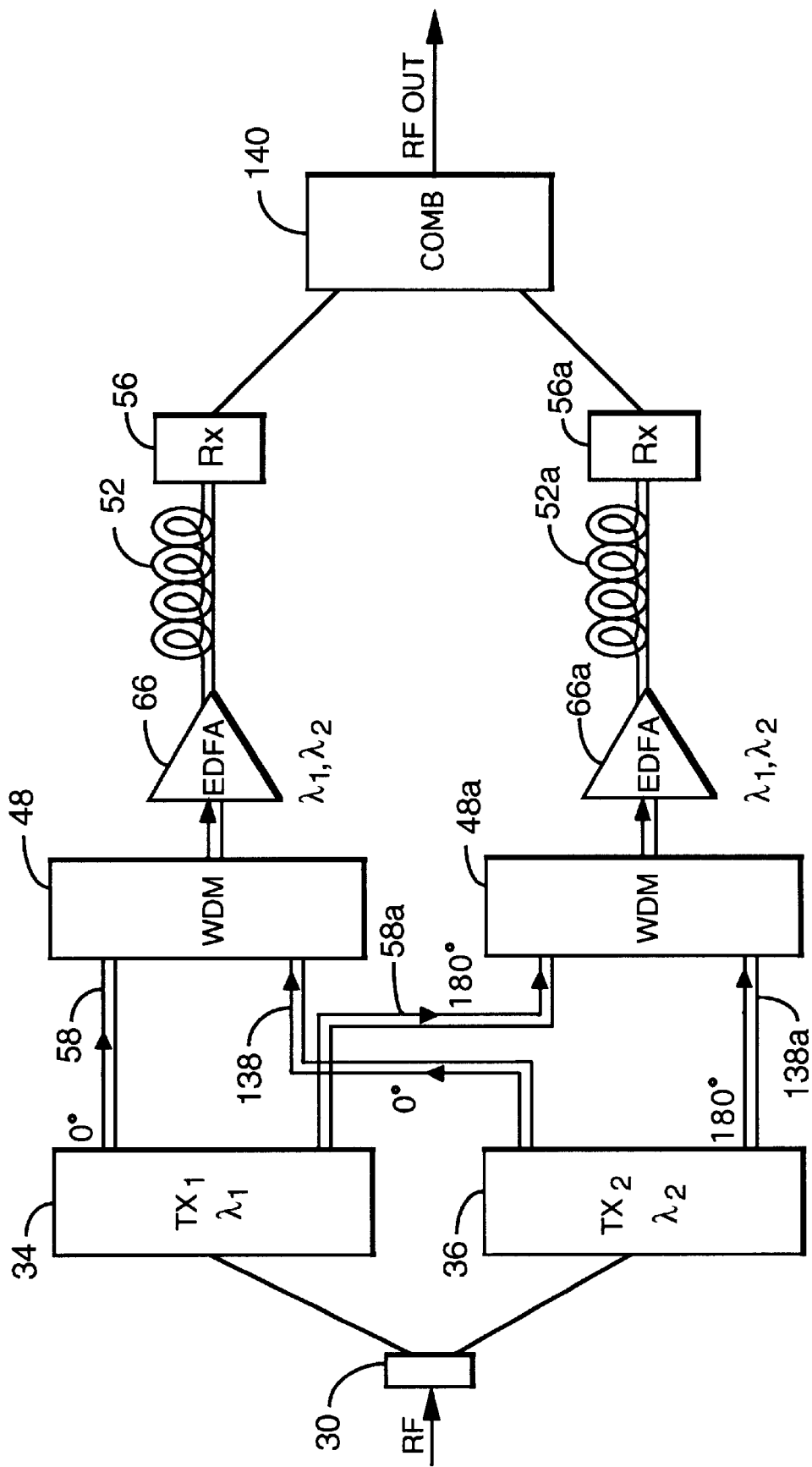

Yet another variation shown in FIG. 6B directly modulates transmitters 34 and 36 with cross coupling of their output signals. In this case, each transmitter 34 outputs two output signals by incorporation of an appropriate modulator as described in the above-referenced patent. For instance, transmitter 34 provides an output signal on coupler 58 and a second on coupler 58a, each 180° out of phase with one another as shown. The same is true for the second transmitter 36. These output signals are cross-coupled into two WDMs 48 and 48a where WDM 48 receives the 0° (in phase) optical signals and WDM 48A receives the 180° (out of phase) optical signals. WDM 48 and 48a respectively drive the upper and lower channels, each of which has its own receiver 56, 56a of one of the types described above using the known differential detection. The RF signals from receivers 56 and 56a are combined by an RF combiner 140 again of the type described in the above-referenced patent.

Yet another embodiment (not shown) would have a transmitter system as in FIG. 6B and a receiver system as in FIG. 6A.

FIGS. 7A and 7B show two somewhat different optical communications systems according to this invention; both use elements as described above. In FIG. 7A, an RF signal to be transmitted is applied to an RF splitter 142 with two output arms, connected respectively to delay elements (RF delay) 146 and 148 which in turn couple the RF signal into the first transmitter 152 and the second transmitter 156, outputting light signals at respectively wavelengths $\lambda_1$ and $\lambda_2$. In this case, the labels T1 and T2 refer to the operating temperatures of the laser diodes or lasers in respectively transmitters 152 and 156.

The optical signals from transmitters 152 and 156 are coupled via optical delay elements 160 and 162 (the letter d refers to a delay element in these figures) to optical fiber spans 170 and 172, each of which is coupled into an input port of a wave division multiplexer (WDM) 180. The output port of WDM 180 is coupled to a receiver 188 by a second fiber optic span 182. The receiver 188 outputs an RF signal RF$_{out}$. In this case, the span is either a combination of two optical fibers 170, 172 or a single optical fiber 182. The first optical fiber span 170 carries a signal having wavelength $\lambda_1$ and the second optical fiber 172 carries a signal having wavelength $\lambda_2$. If the span is the single optical fiber 182, it carries two wavelengths $\lambda_1$, $\lambda_2$.

With reference to the somewhat different system of FIG. 7B, the left hand side of the system is identical to that of FIG. 7A, however, the receiver end, instead of receiver 188 in FIG. 7A the second WDM 194 is present. WDM 194 in turn drives two optical delay elements 196, 198 which respectively are coupled to receivers 202 and 204 which output RF signals which are delayed by respectively RF delay elements 210, 212. The output signals from delay elements 210, 212 are combined by RF combiner 216 to produce the RF out signal. As can be seen, there is delay either in the optical regime (elements 196, 198) or in the RF regime (elements 210, 212) at the receiver end, or a combination thereof. In contrast in FIG. 7A the delay is only present at the transmitter end.

Figure 8A:
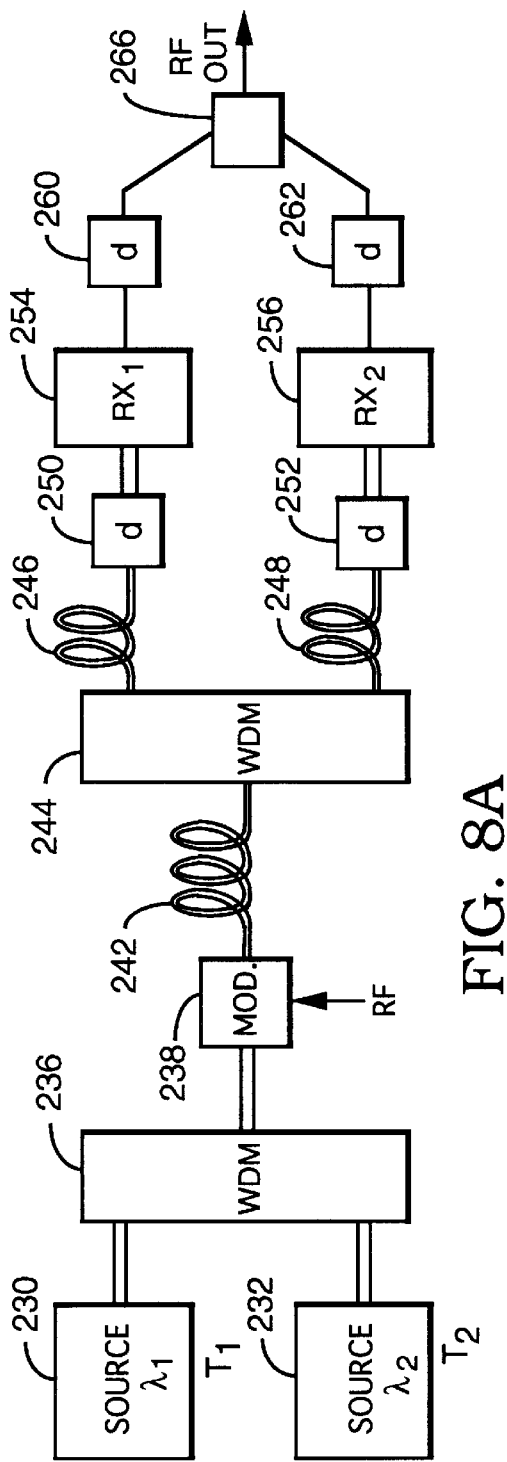
Figure 8B:
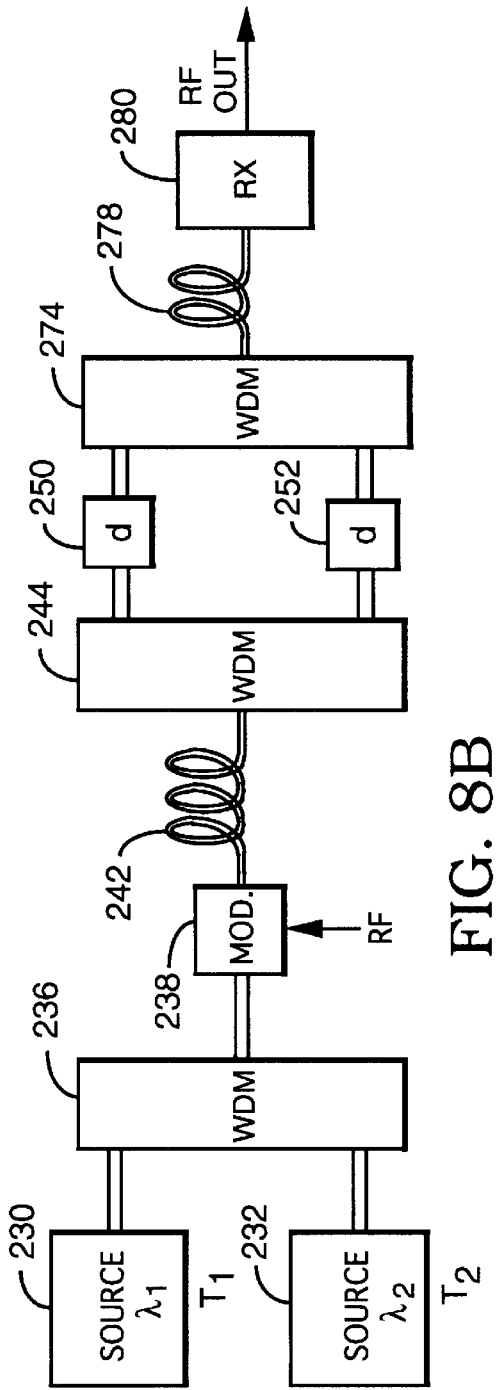

FIGS. 8A and 8B show additional embodiments in accordance with this invention with external modulation of the light sources. In FIG. 8A, the first light source 230 outputs a light beam having wavelength $\lambda_1$ and the second light source 232 outputs a light beam having wavelength $\lambda_2$; light sources 230, 232 operate respectively at different temperatures T1 and T2. Light sources 230 and 232 both drive WDM 236 which provides an output optical signal to the external modulator 238 which is driven by the RF signal. The optical output signal from modulator 238 is coupled to an optical fiber span 242, the other end of which is coupled to a second WDM 244 which provides two output signals coupled to respectively fiber spans 246 and 248. Here again, as shown also in FIGS. 7A and 7B, the actual optical fiber span (i.e., the long span) may be fiber span 242 or fiber spans 246, 248.

The receiver ends of spans 246 and 248 are coupled respectively to optical delay elements 250, 252 which in turn drive receivers 254, 256. Receivers 254, 256 provide RF signals to delay elements 260 and 262, the output signals from which are combined by RF combiner 266 to provide the RF out signal.

A variant of the FIG. 8A embodiment is shown in FIG. 8B, where at the right hand portion of the figure, the WDM 244 drives two delay elements 250, 252 which are in turn coupled to a third WDM 274 which in turn drives the fiber span 278, the other end which is coupled to, a receiver 280. In this case the only delay provided is by the optical delay elements 250, 252.

These figures thus illustrate various optical communications systems using WDM's contemplated in accordance with this invention. Of course, the invention is not limited to the disclosed embodiments.

Moreover, the present invention may be combined with the SBS-suppressing modulation approach described in copending U.S. patent application Ser. No. 08/559,057, filed Nov. 16, 1996 by Alan C. Nilsson, entitled Multi-Tone Phase Modulation In Light Signal Wave Communication System, incorporated herein by reference. Channel folding is a consequence of the multi-tone phase modulation that results in possibly higher noise, i.e. lower CNR, at certain RF frequencies. By adjusting the relative phase of the SBS-suppressing RF tone to the laser diodes in the transmitters, channel (or SBS suppression induced high channel noise) is reduced or eliminated.

Of course, if the type of fiber chosen for the fiber optical span has little to no dispersion over the difference between wavelengths $\lambda_1$ and $\lambda_2$, little to no phase delay adjustment is required. Also, in accordance with the invention, for instance in the embodiment of FIG. 2, by applying both signals to a single optical fiber, a path length between the signals is essentially constant, making use of the "pilot tones" and dynamic path equalization as described for instance in the above-referenced U.S. Pat. No. 5,253,309 unnecessary in some embodiments.

This disclosure is illustrative and not limiting; further modifications will be apparent to one skilled in the art in the light of this disclosure and are intended to fall within the scope of the appended claims.

We claim:

1. An optical communications transmitter system comprising:

a first light source outputting a first light beam having a first wavelength;

a second light source outputting a second light beam having a second wavelength differing from the first wavelength;

a wave division multiplexer, both the first and second light beams being coupled to input ports of the wave division multiplexer, and the wave division multiplexer having an output port, wherein the output port is coupled to an optical fiber span for transmission of an optical signal including both the first and second wavelengths;

wherein the optical signal at both the first and second wavelengths is modulated by the same RF information; and a modulator coupled between the output port of the wavelength division multiplexer and the fiber optical span, wherein an RF signal carrying the RF information is coupled to an electrical port of the modulator.

2. The transmitter system of claim 1, wherein the modulator modulates an intensity and/or phase of the optical signal using the RF signal.

3. The transmitter system of claim 1, further comprising an optical amplifier coupled between the output port of the wavelength division multiplexer and the span of optical fiber.

4. The transmitter system of claim 1, wherein the first and second wavelengths differ by less than 10 nm.

5. The transmitter system of claim 1, wherein the first and second light sources each include a laser diode.

6. The transmitter system of claim 1, wherein the RF information is multi-channel TV.

7. The transmitter system of claim 1, wherein the RF information is frequency division multiplexed.

8. The transmitter system of claim 1, further comprising a delay element associated with one of the light sources.

9. The transmitter system of claim 8, wherein the delay element is a length of optical fiber coupled between the first light source and the wavelength division multiplexer.

10. The transmitter system of claim 8, wherein the delay element is a length of RF transmission media.

11. A method of transmitting RF information on a span of optical fiber, comprising:

generating first and second light beams of differing wavelengths;

wavelength division multiplexing both the first and second light beams;

modulating both the first and second light beams with the same RF information; and coupling the modulated and wavelength division multiplexed first and second light beams to the span of optical fiber, wherein after multiplexing, the light beams are modulated by the RF information.

12. The method of claim 11, wherein the first and second light beams are each generated by modulating a light source by the RF information.

13. An optical communications system comprising:

a transmitter system outputting two wavelength division multiplexed optical signals, each carrying the same RF information;

a span of optical fiber coupled to the transmitter system;

a receiver coupled to the span of optical fiber, wherein the transmitter system comprises:

a first light source outputting a first light beam having a first wavelength.

a second light source outputting a second light beam having a second wavelength differing from the first wavelength; and a wavelength division multiplexer, both the first and second light beams being coupled to input ports of the wavelength division multiplexer, and the wavelength division multiplexer having an output port, wherein the output port is coupled to the optical fiber span; and a modulator coupled between the output port of the wavelength division multiplexer and the fiber optical span, wherein an RF signal carrying the RF information is coupled to an electrical port of the modulator.

14. The optical communications system of claim 13, wherein the modulator modulates an intensity and/or phase of the optical signal using the RF signal.

15. The optical communications system of claim 13, further comprising an optical amplifier coupled between the output port of the wavelength division multiplexer and the span of optical fiber.

16. The optical communications system of claim 13, wherein the two optical signals differ in wavelength.

17. The optical communications system of claim 16, wherein the two optical signals differ in wavelength by less than 10 nm.

18. The optical communications system of claim 13, wherein the first and second light sources each include a laser diode.

19. The optical communications system of claim 13, wherein the RF information is multi-channel TV.

20. The optical communications system of claim 13, wherein the RF information is frequency division multiplexed.

21. The optical communications system of claim 13, further comprising a delay element associated with one of the light sources.

22. The optical communications system of claim 21, wherein the delay element is a length of optical fiber coupled between the first light source and the wavelength division multiplexer.

23. The optical communications system of claim 21, wherein the delay element is a length of RF transmission media.

* * * * *